(No Model.)
C. E. ROBERTS.
BALL BEARING AXLE.
No. 598,535. Patented Feb. 8, 1898.
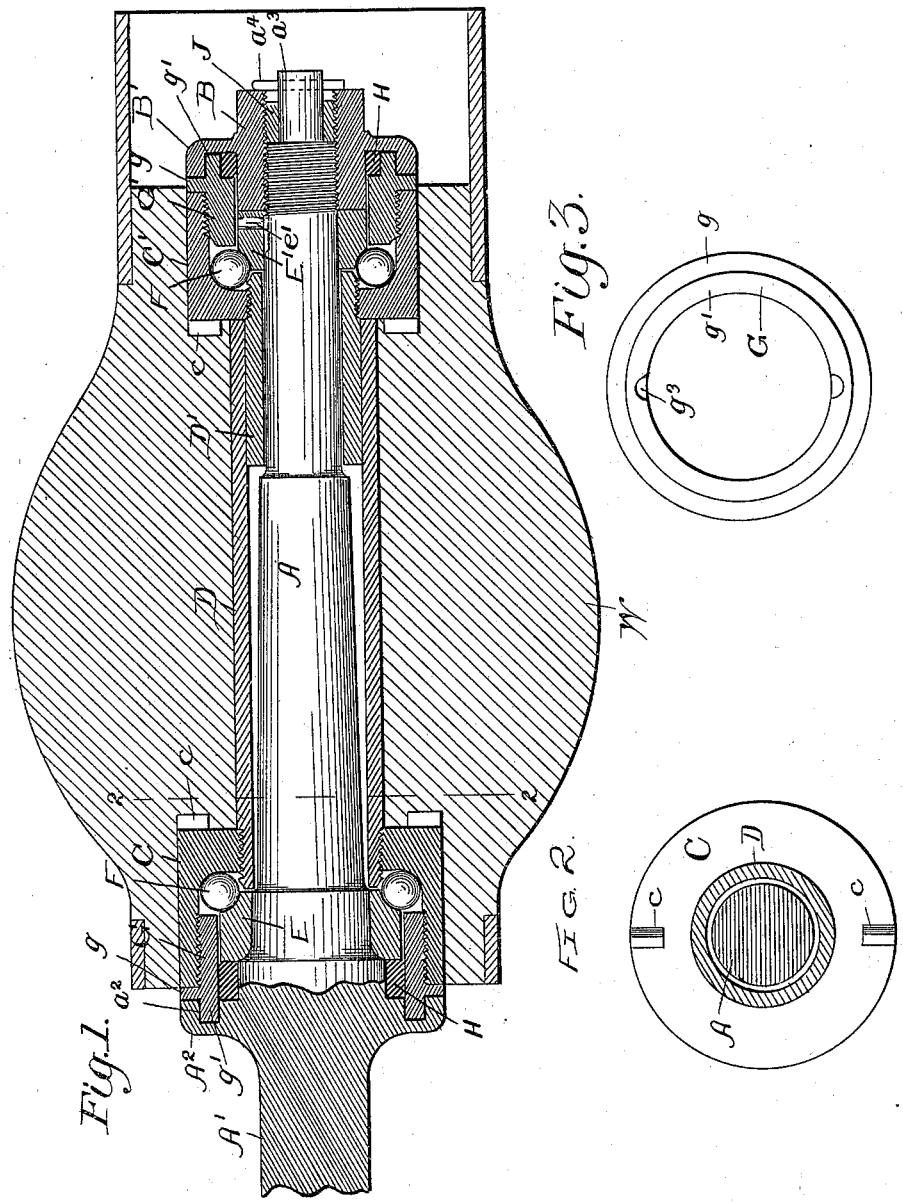
WITNESSES:
INVENTOR:
CHARLES E. ROBERTS
BY Munday, Evarts & Adcock
HIS ATTORNEYS.

UNITED STATES PATENT OFFICE.

CHARLES E. ROBERTS, OF OAK PARK, ILLINOIS.

BALL-BEARING AXLE.

SPECIFICATION forming part of Letters Patent No. 598,535, dated February 8, 1898.

Application filed June 7, 1897. Serial No. 639,684. (No model.)

*To all whom it may concern:*

Be it known that I, CHARLES E. ROBERTS, a citizen of the United States, residing in Oak Park, in the county of Cook and State of Illinois, have invented a new and useful Improvement in Ball-Bearing Axles, of which the following is a specification.

This invention relates to certain improvements in ball-bearings for axles.

The objects attained by it are chiefly a construction by which the balls may be securely held in the cups when the wheel is removed from the axle and which yet permits the ready removal of the balls or the cleansing of the races whenever desirable, and, secondly, a construction which shall exclude water and dirt more perfectly than other constructions.

The nature of the invention and the details thereof are fully set forth in the description thereof which I give below and are also illustrated in the accompanying drawings, forming a part of this specification.

In said drawings, Figure 1 is a longitudinal section of my invention. Fig. 2 is a section thereof on the line 2 2 of Fig. 1. Fig. 3 is a front elevation of one of the retaining-rings.

A represents the spindle of the axle, and A' its arm. Surrounding the latter at its junction with the spindle is an integral collar or flange $A^2$, the outer face of which is grooved concentrically with the spindle, as seen at $a^2$. The point of the spindle is reduced in diameter, as seen at $a^3$, and provided with a transverse opening to receive the cotter-pin $a^4$. Just back of the reduced point is a thread to receive the nut B, by which the wheel is held to the axle. The nut is provided with a cup-shaped flange B', as plainly indicated.

C is an inner cup or head, and C' an outer cup or head, both adapted to set up against the wood hub W of the wheel and both provided with spurs $c$ upon the faces which come against the hub, adapted to enter the wood and prevent any movement by the heads independent of the hubs. The cups are formed upon the interior surface of these heads, as shown, so that they may be appropriately called by either name. The cups or heads are united by a sleeve D, upon which the inner one is threaded and to which the outer one is joined by means of an interior sleeve D', threaded in said outer head and telescoping in the sleeve D. The inner cone is shown at E and fits the base of the spindle, and the outer cone (indicated at E') is adapted to be slipped over the threaded end of the spindle and is preferably keyed to the spindle by pin $e'$ to prevent it from rotating with nut B. The balls are plainly shown in both races and are indicated by the letter F. Each of the cups is also threaded interiorly to engage one of the rings G G'. These rings are preferably provided with peripheral flanges $g$, forming stops to limit the entrance of the rings within the cups, and their ends $g'$ are also adapted to enter one within the groove $a^2$, already mentioned, and the other within the nut-flange B'. Rings G and G' serve to retain the balls in the cups when the wheel is removed from the axle, so that they do not become lost at such times. They do not interfere with the cleaning of the races, and being themselves readily removable they permit the replacing of the balls whenever necessary. The ends $g'$ coact with the flanges $A^2$ and B', into which they enter in excluding dust and water. The spaces H, formed, one between ring G, cone E, and the axle, and the other between ring G' and the nut B, are filled with felt packing to make the entrance of water, &c., still more improbable. The rings G and G' may be turned by any appropriate tool adapted to engage their interior notches $g^3$.

J is a stop-nut inserted in the nut B and engaging the thread in the bore thereof, and acts by its contact with the shoulder at the base of the reduced end of the spindle to limit the extent to which the nut can be forced inward, so that no squeezing of the balls can take place.

The spurs on the cups overcome any tendency by the cups to turn with the rings when the latter are taken out. The spurs are further useful because the outer cup is not otherwise locked against rotation in the sleeve D, and also because they render unnecessary the provision of wings upon sleeve D to hold it against rotation in the hub, thereby enabling me to use plain tubing in manufacturing the sleeves.

The rings are preferably made of some antifriction metal to relieve friction in case the balls should be absent, and they are also preferably rust-proof to prevent rust in case water should find entrance into the bearing. The rings render it possible to use the vehicle without the balls, as in that case the rings will come in contact with the cones and have a wide bearing-surface opposed to the latter. It is not intended, of course, that they should be used in this manner, but they may be without detriment.

I claim—

1. The combination in a ball-bearing of the heads and the connecting-sleeve D, one of said heads being threaded to the sleeve, and the other head having an extension made separate from and threaded to it and sliding within the sleeve, substantially as specified.

2. The combination with the hub, axle and devices for retaining the wheel on the axle, of the heads C and C', and the connecting-sleeve D, one of said heads being threaded directly to the sleeve, and the other being united to it by means of an extension D' sliding telescopically within the sleeve, substantially as specified.

3. The combination with a wood hub of the sleeve D, and the opposing heads at each end of said sleeve, each of said heads having spurs upon their adjacent faces, and one of them being threaded on the sleeve while the other has a sliding connection therewith, substantially as specified.

4. The combination with the cup, cone, balls and an adjacent recessed flange such as $A^2$ or $B'$, of a ring such as G or G', such ring having a peripheral flange setting against the cup and a water-excluding end projection such as $g'$ extending within the stationary flange, substantially as specified.

5. The combination, with the cup, the balls, and the adjacent recessed stationary flange such as $A^2$ or $B'$, of a ring secured in the cup and projecting within the flange, and acting both to retain the balls and exclude the water, substantially as specified.

CHARLES E. ROBERTS.

Witnesses:
 H. M. MUNDAY,
 E. S. EVARTS.